US012679285B2

(12) United States Patent
Kwon et al.

(10) Patent No.: US 12,679,285 B2
(45) Date of Patent: Jul. 14, 2026

(54) OHC MOUNTING BRACKET FOR VEHICLES

(71) Applicant: DAEHAN SOLUTION CO., LTD., Incheon (KR)

(72) Inventors: Choong Ho Kwon, Seoul (KR); Kim Jae Hyun, Incheon (KR)

(73) Assignee: DAEHAN SOLUTION CO., LTD., Incheon (KR)

( * ) Notice: Subject to any disclaimer, the term of this patent is extended or adjusted under 35 U.S.C. 154(b) by 211 days.

(21) Appl. No.: 18/802,162

(22) Filed: Aug. 13, 2024

(65) Prior Publication Data

US 2025/0058719 A1 Feb. 20, 2025

(30) Foreign Application Priority Data

Aug. 18, 2023 (KR) ........................ 10-2023-0108526

(51) Int. Cl.
| | |
|---|---|
| *B60R 11/00* | (2006.01) |
| *B60R 13/02* | (2006.01) |
| *B60R 16/02* | (2006.01) |

(52) U.S. Cl.
CPC .......... *B60R 11/00* (2013.01); *B60R 13/0212* (2013.01); *B60R 16/0215* (2013.01); *B60R 2011/0028* (2013.01); *B60R 2011/0059* (2013.01)

(58) Field of Classification Search
CPC . B60R 11/00; B60R 13/0212; B60R 16/0215; B60R 2011/0028; B60R 2011/0059; B60R 7/04; B60R 11/0264; B60R 2011/0043; B60R 2011/0294; B60Y 2304/07; B60Y 2410/113

USPC ............................. 296/37.8, 37.7, 208, 214
See application file for complete search history.

(56) References Cited

FOREIGN PATENT DOCUMENTS

| | | |
|---|---|---|
| KR | 20170083180 A | 7/2017 |
| KR | 10-2130293 B1 | 7/2020 |
| KR | 10-2020-0134366 | 12/2020 |
| KR | 10-2021-0107193 A | 9/2021 |
| KR | 20220067035 A | 5/2022 |

(Continued)

OTHER PUBLICATIONS

KR20250144001A with English translation; Kwon et al., Oct. 10, 2025 (Year: 2026).*

(Continued)

*Primary Examiner* — Roger L Pang
(74) *Attorney, Agent, or Firm* — Dickinson Wright PLLC

(57) ABSTRACT

A support member may be configured integrally with an OHC bracket so that wiring is easily assembled when the wiring is pressed against the support member, thereby easily assembling the wiring by simply mounting an OHC mounting bracket and also preventing the wiring from easily separating or coming off due to vibrations that occur when a vehicle is traveling and preventing noise or abnormal sounds in advance. In particular, the wiring may be easily assembled by elastically deforming the support member by placing the wiring on the support member and pressing the wiring toward a headliner in a state where the OHC bracket is mounted on the headliner, and an OHC may be firmly supported and fixed without the OHC bracket separating or coming off from the headliner by assembling the wiring in a direction in which the OHC bracket is pressed when the wiring is assembled.

6 Claims, 6 Drawing Sheets

(56)  References Cited

FOREIGN PATENT DOCUMENTS

| KR | 20230060710 A | 5/2023 |
| KR | 10-2023-0108526 A | 7/2023 |

OTHER PUBLICATIONS

English translation of KR20230060710A; https://translationportal. epo.org; May 5, 2026 (Year: 2026).*
English translation of KR102130293B1; https://translationportal. epo.org; May 5, 2026 (Year: 2026).*

* cited by examiner

OHC MOUNTING BRACKET FOR VEHICLES

CROSS-REFERENCE TO RELATED APPLICATION

This application claims priority to and the benefit of Korean Patent Application No. 10-2023-0108526, filed on Aug. 18, 2023, the disclosure of which is incorporated herein by reference in its entirety.

BACKGROUND

1. Field of the Invention

The present invention relates to an overhead console (OHC) mounting bracket for vehicles, and more particularly, to an OHC mounting bracket used to mount an OHC, in which a support member is integrally configured to assemble wiring by placing the wiring on a portion for fixing and supporting wiring so as not to be separated and pressing the wiring toward a surface of a headliner, so that the support member that substantially fixes the wiring is integrally attached to the headliner while being integrated with the OHC mounting bracket, thereby making it possible to not only improve a fixing force, but also improve work efficiency since there is no need to separately mount the support member. In addition, the present invention relates to an OHC mounting bracket capable of easily assembling and removing wiring by pressing the wiring toward a surface of a headliner to assemble the wiring or pulling the wiring to separate the wiring.

2. Discussion of Related Art

In general, in the interior of a vehicle, an overhead console (OHC) is mounted on a headliner so that a driver may easily adjust various functions while driving. The OHC is mounted on the front of the headliner so that the driver and a front seat passenger may easily access and operate the OHC, and also includes various functions such as car interior lighting, heating and cooling temperature, audio and multimedia control. The OHC is mounted on an OHC bracket (plate) installed on an edge of a mounting hole formed through the headliner.

In Korean Patent Registration No. 10-2130293 (Registration Date: Jun. 30, 2020), Korean Patent Publication No. 10-2021-0107193 (Publication Date: Sep. 1, 2021), and Korean Patent Publication No. 10-2020-0134366 (Publication Date: Dec. 2, 2020) below, technology related to the OHC bracket used to mount the OHC is disclosed.

In Korean Patent Registration No. 10-2130293, when manufacturing an OHC bracket to be mounted for fixing and supporting an OHC on a headliner, since an elastic portion is configured to fix the wiring, by simply fixing the OHC bracket to the headliner, wiring may be easily and conveniently mounted or removed using the elastic portion without any additional means or fixing. In particular, since at least one tension hole is formed through the central part of the elastic portion in width, the elastic portion may easily bend and unfold to stably elastically support and fix the wiring and easily fix the wiring even when the elastic portion is long. In addition, since a guide portion is formed to bend outward and protrude an edge of the elastic portion, the wiring may be easily inserted into a cover part while pushing this guide portion, thereby making assembly work easy and convenient.

Korean Patent Publication No. 10-2021-0107193 provides an OHC mounting bracket for vehicle headliners capable of firmly fixing the mounting bracket by forming at least two guiding slots through an edge of a mounting bracket to allow an adhesive used to fix the mounting bracket to the headliner to adhere to a surface of the headliner while wrapping around the guiding slots and the edge of the mounting bracket, thereby increasing a contact area. In particular, the OHC mounting bracket for vehicle headliners that allows the mounting brackets to be evenly attached to both sides of the mounting bracket by forming guiding slots symmetrically through each other is provided. In addition, the OHC mounting bracket for vehicle headliners in which the edge of the mounting bracket may be lifted off by being formed to protrude from the surface of the headliner, allowing more adhesive to penetrate through a lifted space so that the mounting bracket is more firmly attached to the surface of the headliner is provided.

In Korean Patent Publication No. 10-2020-0134366, a feeder cable is inserted between two elastic rings protruding to face each other on an OHC bracket to provide elastic support, and since the two elastic rings are configured to support the feeder cable at offset positions, the feeder cable that supplies power to an added component may be fixed in a designated position, thereby preventing missing assembly or separation after assembly. In particular, since the feeder cable may be assembled by hanging on the two elastic rings by inserting the feeder cable between the elastic rings and then rotating the feeder cable, the feeder cable may be easily and quickly assembled and conveniently used without preparing separate assembly equipment. In addition, since one end of the elastic ring is manufactured to be thinner than the other, enabling easy deformation, the feeder cable may be more quickly and accurately assembled.

SUMMARY OF THE INVENTION

In the OHC brackets in the related art, a mounting bracket may be installed to fix the branched wiring so that power is supplied to a rearview mirror, a black box, or the like, but when fixing the wiring using the mounting bracket, the following problems occur.

(1) After manufacturing a mounting bracket separately from an OHC bracket, a task of attaching the mounting bracket to the OHC bracket or a section of a headliner around where the OHC bracket is installed to support wiring is required.

(2) When attaching the mounting bracket to the OHC bracket or headliner using adhesive or the like in this way, the wiring is also attached to the headliner, and then the mounting bracket is used to support the wiring so that the wiring does not come off or separate. Accordingly, when attaching the wiring with the adhesive, the wiring becomes twisted or bent, and accordingly, it is difficult to attach the wiring to a designated position.

(3) This not only leads to poor assembly of the wiring, but also causes the wiring to be lifted off from the headliner and causes the wiring to separate or deviate from a designated position by receiving vibrations generated when a vehicle is traveling, which acts as one factor that causes abnormal sounds.

(4) In addition, to solve the problems, the wiring and the mounting bracket have to be attached using a large amount of adhesive. This not only increases the amount of use of adhesive, but also acts as a factor in reducing work efficiency.

(5) Meanwhile, as another method to solve the problems, there is a method of assembling and using the mounting bracket into the OHC bracket in an inserting manner, but the configuration causes the following problems.

(6) It is difficult to fix a hook that acts as a catch with adhesive, and thus a mounting force of the mounting bracket is reduced. This causes a concern that the mounting bracket may easily be separated or come off due to vibrations and the like that occur while traveling, resulting in noise and abnormal sounds.

(7) In addition, since the hook or the like has to be manufactured and installed separately around the OHC bracket, an installation space is required. Since a work space needs to be increased further, not only does space utilization decrease, but it is also difficult to secure a space with surrounding components, and thus there are also difficulties in assembling other components.

(8) Further, as the assembly is constructed by inserting the wiring between the mounting bracket and the headliner, during a process of assembling the wiring, the mounting bracket may become separated or come off from the headliner, resulting in poor assembly.

The present invention has been conceived in consideration of the aforementioned problems, and is directed to providing an overhead console (OHC) mounting bracket for vehicles capable of easily assembling wiring by simply mounting the OHC mounting bracket by configuring a support member integrally with an OHC bracket used when mounting an OHC so that the wiring is easily assembled when the wiring is pressed against the support member, and also capable of preventing the wiring from easily separating or coming off due to vibrations that occur when a vehicle is traveling and preventing noise or abnormal sounds in advance as integrally configured in this way.

The present invention is also directed to providing an OHC mounting bracket for vehicles capable of easily assembling wiring by configuring a support member to be elastically deformed to enable easy assembly by placing the wiring on the support member and pressing the wiring toward a headliner in a state where an OHC bracket is mounted on the headliner, and also capable of firmly supporting and fixing an OHC without the OHC bracket separating or coming off from the headliner by assembling the wiring in a direction in which the OHC bracket is pressed when the wiring is assembled.

In order to solve the aforementioned problems, according to an aspect of the present invention, there is provided an overhead console (OHC) mounting bracket for vehicles including a bracket body (100) installed on an edge of a mounting hole (11) formed to pass through a headliner (10) to mount an OHC, in which one or more support members for fixing and supporting wiring (W) are formed integrally with the bracket body (100) at a front and both sides based on a traveling direction of a vehicle, and the support member includes a pair of hooks (110' and 110") that have ribs (111) formed to integrally protrude on surfaces thereof facing each other and are formed so that the wiring W is forcibly inserted between the surfaces by placing the wiring W between the surfaces and pressing the wiring toward a surface of the headliner (10), a plurality of reinforcing protrusions (120) formed at predetermined intervals on an outer surface of a hook (110') formed toward an outer edge of the bracket body (100), and a plurality of connecting members (130) formed at predetermined intervals between an outer surface of a hook (110") formed on an inner edge of the bracket body (100) and a bent and protruding portion on the inner edge of the bracket body (100).

In particular, a gap between the hooks (110' and 110") may become narrower as the hooks (110' and 110") protrude further outward from a surface of the bracket body (100).

In addition, the ribs (111) may be formed at predetermined intervals along a direction in which the wiring (W) is inserted between the hooks (110' and 110") and have entrances formed to protrude to face each other.

Finally, in the hook (110') forming an outer side of a support member installed in the front based on the traveling direction of the vehicle among the support members, a press-fit groove (112) may be formed by being cut to forcibly insert the wiring (W).

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
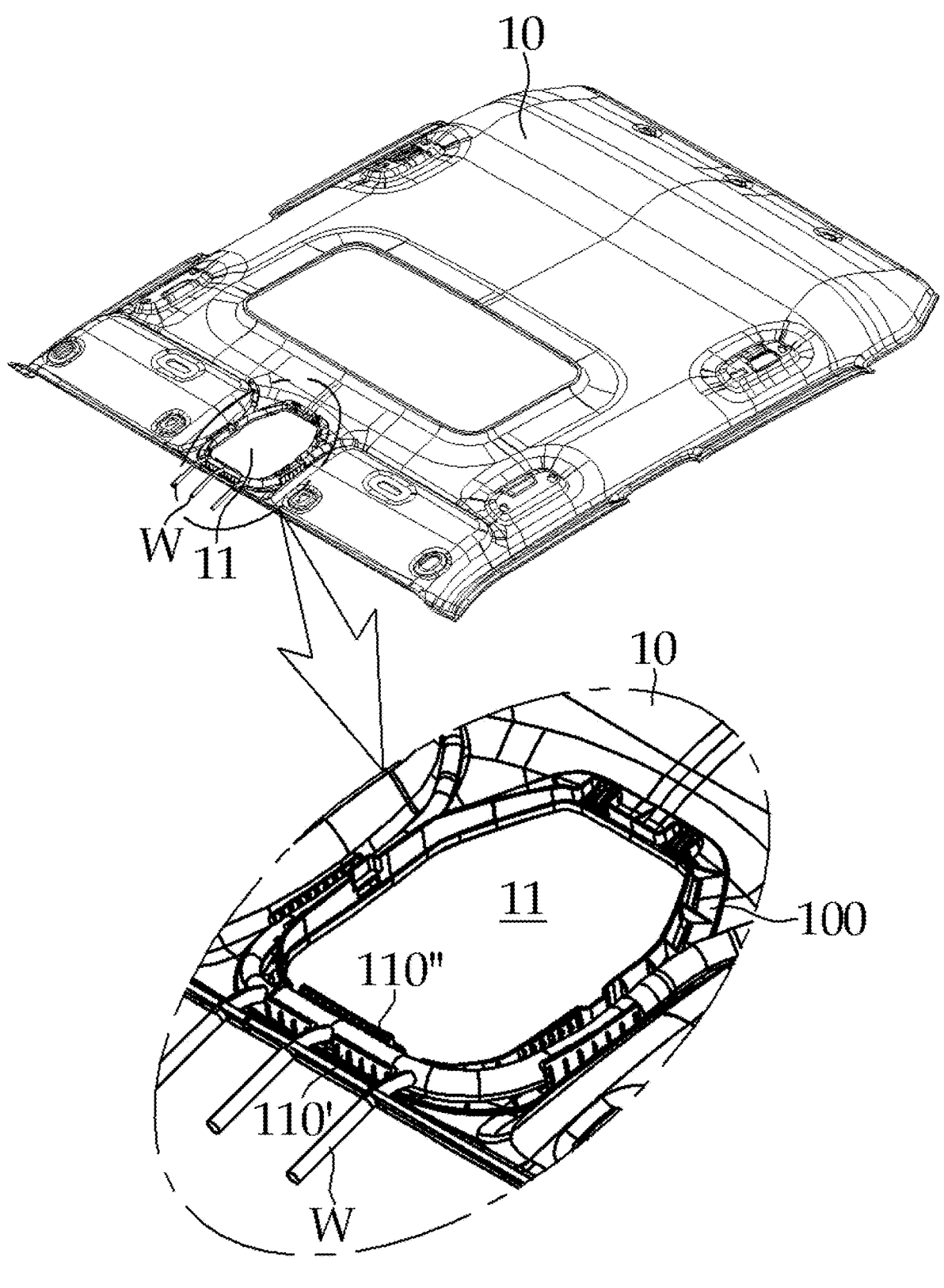
FIG. 1 is a perspective view showing a headliner equipped with an OHC mounting bracket for vehicles according to the present invention.

Hereinafter, preferred embodiments of the present invention will be described in more detail with reference to the accompanying drawings. Prior to the description, terms or words used in this specification and claims should not be restrictively interpreted as ordinary meanings or dictionary-based meanings, but should be interpreted as meanings and concepts conforming to the technical aspects of the present invention according to the principle that an inventor is allowed to properly define concepts of terms to describe his or her invention in the best ways.

Therefore, embodiments described in the specification and configurations shown in the drawings are merely the most preferred embodiment of the present invention, but are not intended to fully describe the technical aspects of the present invention, so it should be understood that a variety of other equivalents and modifications could be made thereto at the time of filing the application.

[Configuration of OHC Mounting Bracket for Vehicles]

As shown in FIGS. 1 to 5B, an overhead console (OHC) mounting bracket according to the present invention includes a bracket body 100, and the bracket body 100 is configured integrally with a support member for forcibly inserting and fixing wiring W.

In particular, the support member includes a pair of hooks 110' and 110" having ribs 111 formed on each of surfaces thereof facing each other, and is configured so that the wiring W is forcibly assembled by placing and pressing the wiring W between the hooks 110' and 110" toward a headliner 10, thereby making it possible not only to eliminate a process of separately manufacturing or installing the support member, but also to prevent the bracket body 100 from separating or peeling off from the headliner 10 when the wiring W is assembled or a vehicle is traveling by pressing the headliner 10 even when the wiring W is mounted.

In addition, the hooks 110' and 110" are configured to protrude from a surface of the bracket body 100 to face each other, and in this case, since the hooks 110' and 110" are configured so that a gap therebetween becomes narrower as the hooks protrude further outward from the surface of the bracket body 100, when the wiring W is placed and pressed between the hooks 110' and 110", the hooks 110' and 110" may forcibly spread and return to their original state, thereby firmly supporting and fixing the wiring W.

In addition, the ribs 111 are formed in a mounting direction of the wiring W inserted between the hooks 110' and 110" and entrances of the ribs 111 are formed to protrude to face each other, so that a contact area with the wiring W is reduced, thereby easily assembling the wiring and preventing the assembled wiring W from easily separating or coming off.

Finally, in a hook 110' formed on the outside of the two hooks 110' and 110" that make up the support member installed in front of the headliner 10, a press-fit groove 112 may be formed at a point where the wiring W branches by being cut so that the wiring W is forcibly inserted, thereby assembling the wiring W at a designated position easily and conveniently, and accurately.

Hereinafter, such a configuration will be described in more detail with reference to the accompanying drawings. Here, reference numeral 10 represents the headliner of a vehicle, "11" represents a mounting hole for mounting an overhead console (OHC), and "W" represents the wiring that branches out electric power from the headliner to a place where the power is needed.

A. Bracket Body

Figure 2:
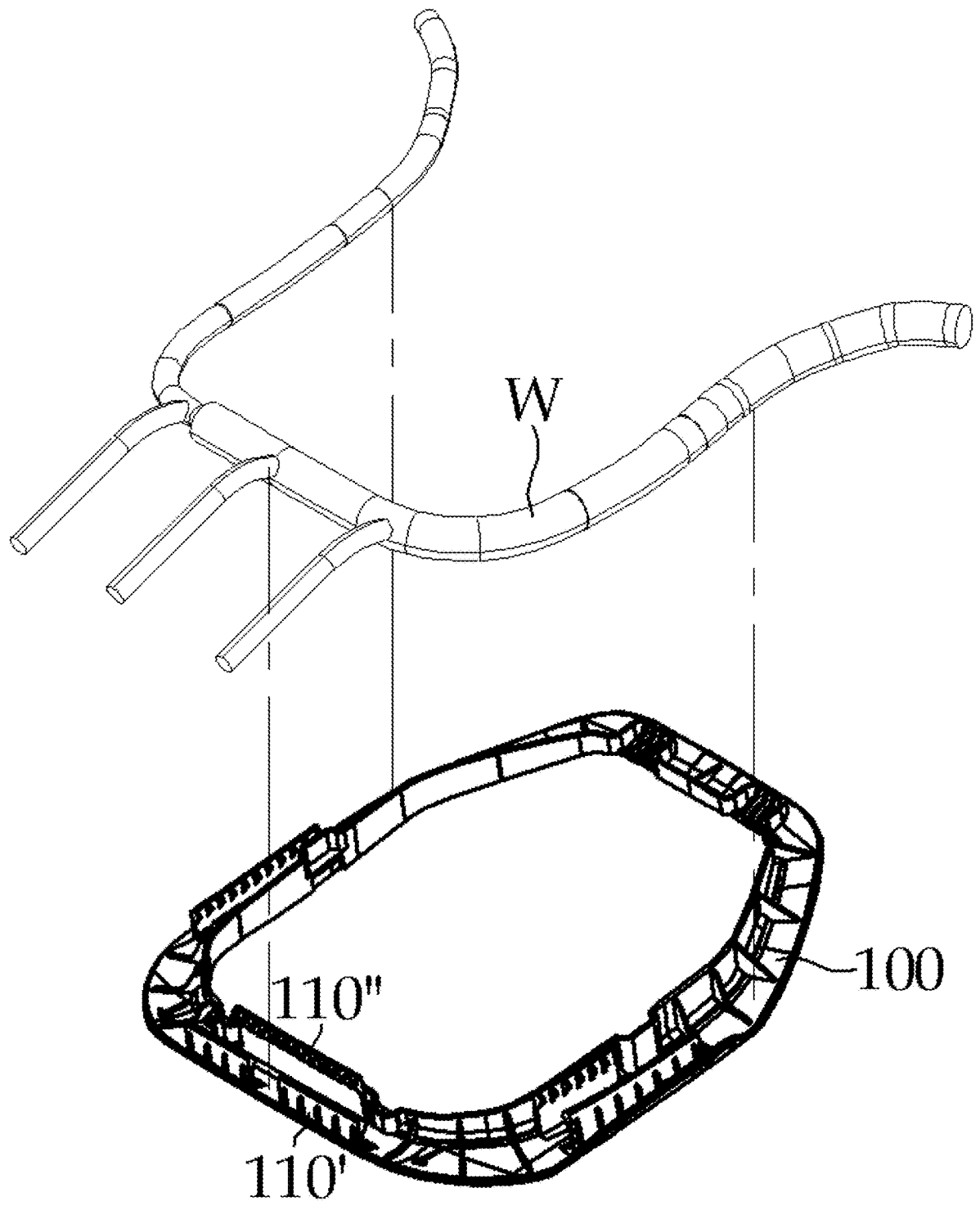
FIG. 2 is an exploded perspective view showing a state before wiring is mounted on the OHC mounting bracket for vehicles according to the present invention.

As shown in FIGS. 1 and 2, the bracket body 100 is mounted on an edge of the mounting hole 11 formed in the headliner 10 for mounting the OHC, and used when mounting the OHC.

In particular, the support member for supporting and fixing the wiring W is formed integrally with the bracket body 100, as shown in FIGS. 2 to 5B.

B. Support Member

As shown in FIGS. 3 to 5B, the support member may be formed one on each of a front edge of the headliner 10 in the bracket body 100 based on a traveling direction of the vehicle and edges opposite to each other on both sides based on the front edge. It is preferable to determine a position for forming the support member in consideration of a fixing position of the wiring W installed around the bracket body 100.

As shown in FIGS. 3 to 5B, the support member includes a pair of hooks 110' and 110", a plurality of reinforcing protrusions 120, and connecting members 130.

1. Hooks

As shown in FIGS. 3 to 5B, a pair of hooks 110' and 110" are formed to protrude from the bracket body 100 to face each other.

Figure 5A:
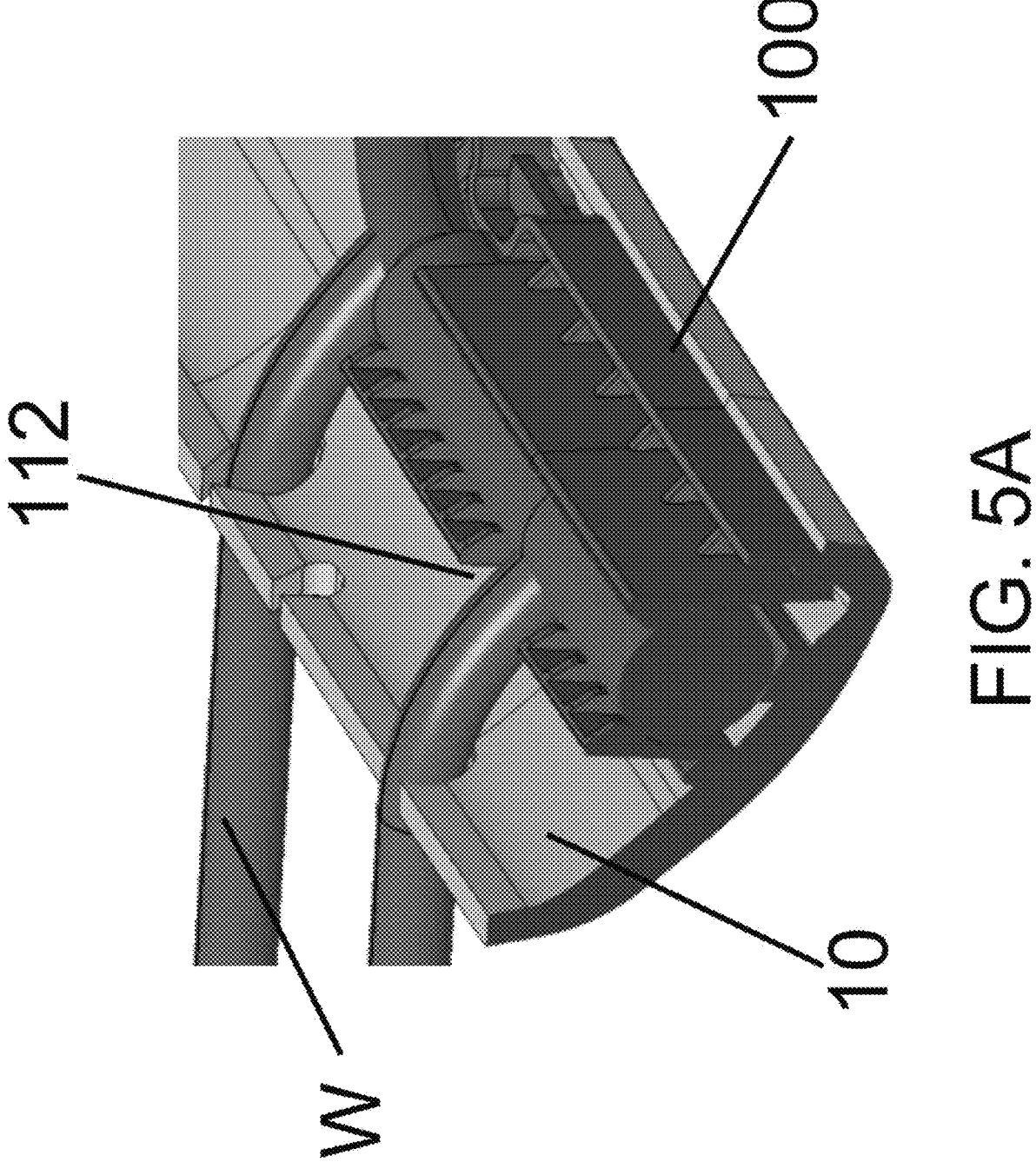
FIG. 5A is a cross-sectional perspective view and FIG. 5B is a cross-sectional view.
Figure 5B:
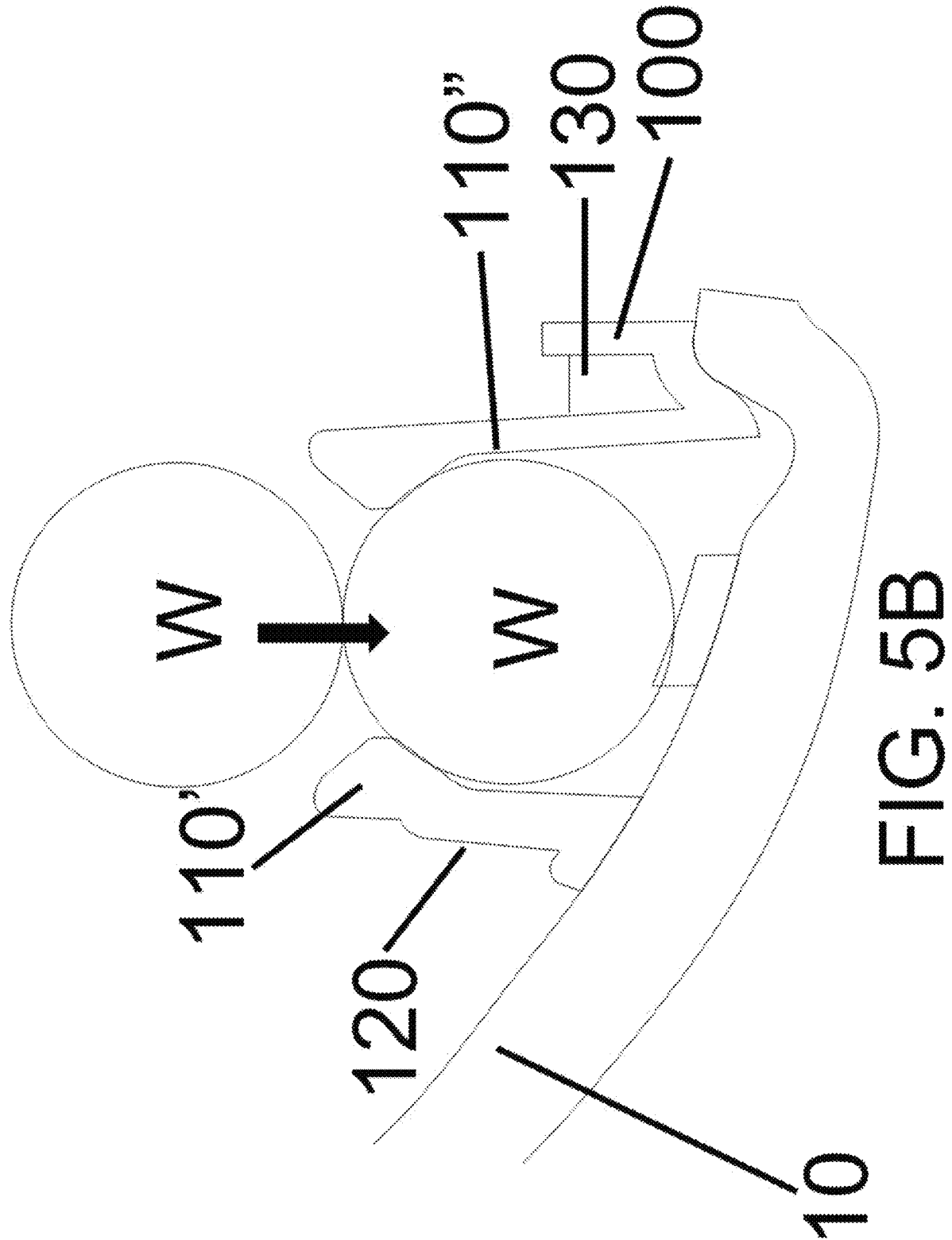

In particular, as shown in FIGS. 5A and 5B, it is preferable to configure the hooks 110' and 110" so that, as the wiring W is placed and pressed between the hooks 110' and 110", the hooks 110' and 110" spread to both sides and the wiring W is forcibly inserted therebetween and assembled.

In this case, as shown in FIGS. 5A and 5B, it is preferable that, by configuring the hooks 110' and 110" so that the wiring W is assembled by being pressed toward the headliner 10, the bracket body 100 may not separate or come off from the headliner 10 even when a force applied when trying to assemble the wiring W is applied to the bracket body 100, thereby stably fixing and installing the bracket body 100. In addition, it is preferable that the hooks 110' and 110" may be configured so that, when protruding outward from the bracket body 100, the gap between the hooks 110' and 110" becomes narrower as a distance from a surface of the bracket body 100 increases, thereby more firmly fixing the wiring W when the wiring W is assembled in this way.

Figure 3:
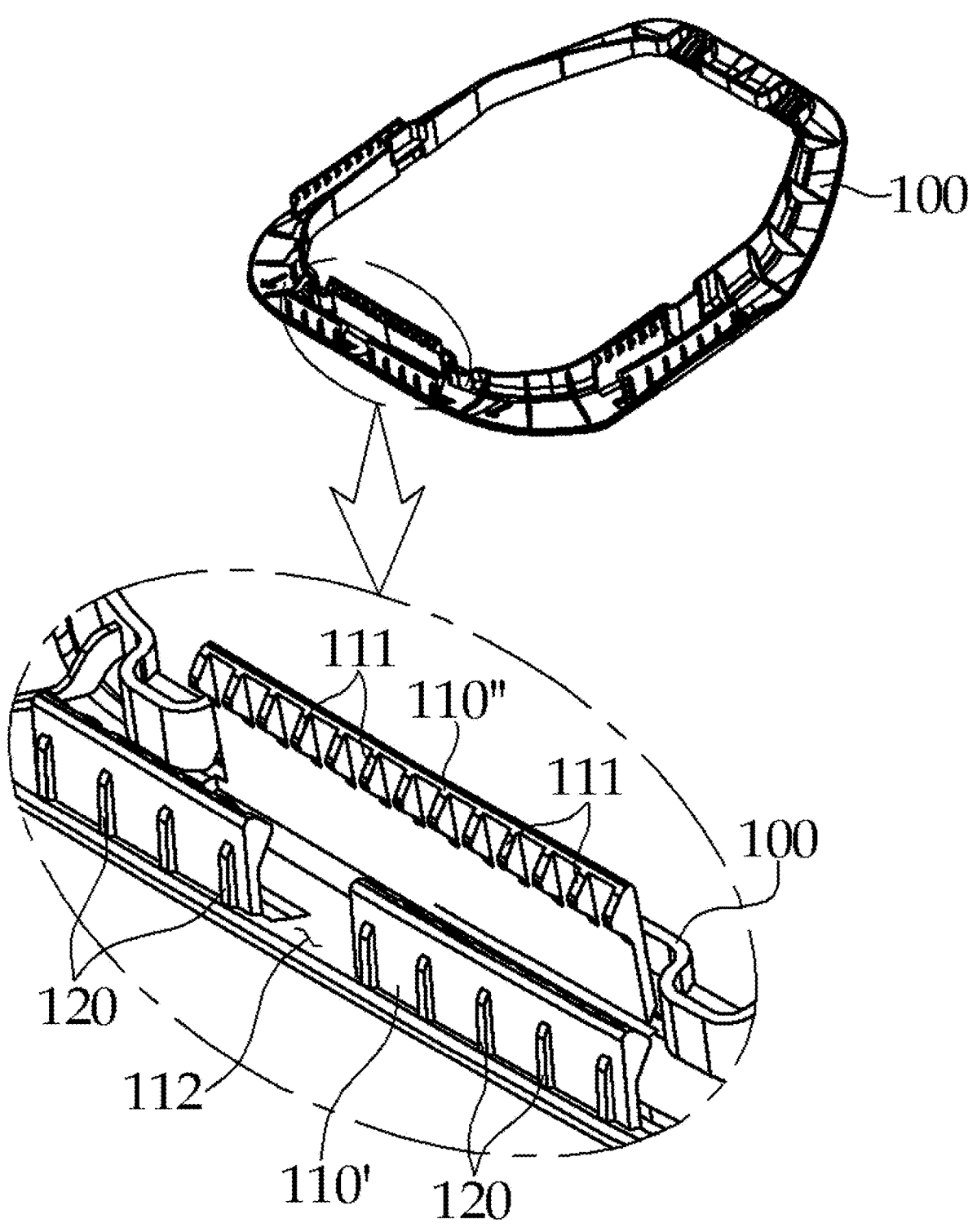
FIG. 3 is a front perspective view of the OHC mounting bracket for vehicles according to the present invention.
Figure 4:
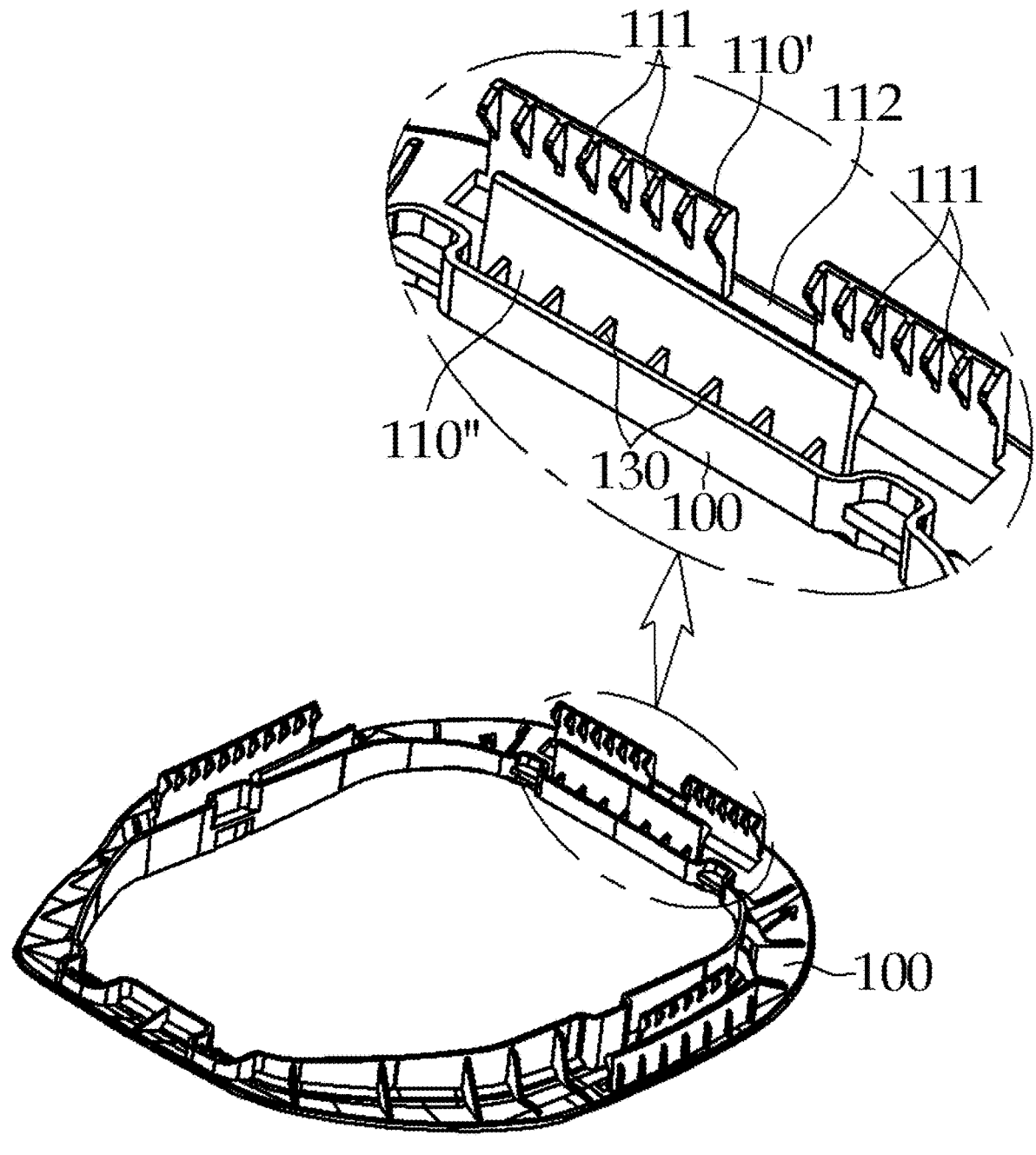
FIG. 4 is a rear perspective view of the OHC mounting bracket for vehicles according to the present invention; and A set of FIGS. 5A and 5B are views showing a state where the OHC mounting bracket for vehicles according to the present invention is mounted on the headliner, where

In addition, as shown in FIGS. 3 and 4, it is preferable that the hooks 110' and 110" are configured so that the ribs 111 are formed on surfaces thereof facing each other, thereby preventing the wiring W from separating or coming off due to vibrations or the like by placing the wiring W between the hooks 110' and 110" and forcing the hooks 110' and 110" to spread when the wiring W is pressed and then wrap the wiring W.

In this case, as shown in FIG. 3, it is preferable that the ribs 111 may be formed to be long in a direction of pressing the wiring W so that when the wiring W is placed and assembled by being pressed between the hooks 110' and 110", the wiring W is guided to be inserted between the hooks 110' and 110" by being pressed in the designated direction while minimizing a contact area with the wiring W. In addition, it is preferable that the ribs 111 may be configured so that entrances thereof protrude in a direction facing each other, thereby functioning as jaws so that the wiring W does not easily separate or come off when the wiring W is inserted between the hooks 110' and 110".

Finally, as shown in FIGS. 3 and 4, among the hooks 110' and 110" installed in front of the headliner 10, in a hook 110' installed on the outside, at least one press-fit groove 112 is formed by being cut. In this case, when there is another wiring branching from the part of the wiring W mounted between the hooks 110' and 110", the press-fit groove 112 is used to allow the another wiring to branch.

2. Reinforcing Protrusion

As shown in FIG. 3, the reinforcing protrusion 120 is formed integrally with the outer surface of the hook 110' described above. In this case, it is preferable that the reinforcing protrusion 120 may be formed to protrude from the hook 110', but it is more preferable that the reinforcing protrusion 120 may be formed to extend to the surface of the bracket body 100 so that the reinforcing protrusion 120 is configured to more firmly support and fix the hook 110'.

As shown in FIG. 3, it is preferable that a plurality of reinforcing protrusions 120 may be formed at predetermined intervals to reinforce the rigidity of the hook 110' while minimizing weight increase. Here, the predetermined intervals refer to intervals between two neighboring reinforcing protrusions 120, and the intervals may be the same, or the intervals between two neighboring reinforcing protrusions 120 may be differently formed.

3. Connecting Member

As shown in FIGS. 4 to 5B, the connecting member 130 is a member that protrudes from an inner edge of the bracket body 100 and connects the bracket body 100 to another hook 110". It is preferable that the connecting member 130 is formed integrally with the bracket body 100 to easily mount the OHC when manufacturing the bracket body 100.

In addition, as shown in FIGS. 4 to 5B, a plurality of connecting members 130 may be integrally formed at predetermined intervals between the protruding portions by being bent between the hook 110" and the bracket body 100, and the intervals between two adjacent connecting members 130 may be the same, or at least one of the intervals may be differently formed.

As described above, in the present invention, since the support member configured to assemble the wiring by placing the wiring between a pair of hooks formed on the bracket body to face each other and pressing the wiring toward the headliner is configured integrally with the bracket body, there is no need to install a separate support member, the wiring may be easily installed, and in addition, the wiring may be stably supported and fixed without separating or peeling off from a position where the bracket body is mounted despite an external force applied when the wiring is mounted.

An OHC mounting bracket for vehicles according to the present invention has the following effects.

(1) Since a support member fixing and supporting wiring is molded integrally with a bracket body, there is no need to separately manufacture and install the support member, and the wiring can be stably supported and fixed easily and conveniently without using adhesive.

(2) In addition, when wiring is placed and pressed between two hooks, the wiring can be easily fixed and installed, and furthermore, as the wiring is assembled while being pressed toward a headliner, the wiring can be easily and conveniently assembled while preventing the bracket body from easily coming off or separating from the headliner.

(3) In addition, since the hooks supporting and fixing the wiring are configured to be supported by connecting members and reinforcing protrusions, thereby firmly supporting and fixing the wiring, the wiring can be stably supported and fixed without easily coming off or separating despite vibrations generated when a vehicle is traveling.

(4) Meanwhile, since the hooks have ribs formed on surfaces thereof facing each other to fix the wiring, and the ribs are formed to be long along a direction of the wiring inserted into the hooks, and entrances thereof are formed to protrude to face each other, the wiring can be prevented from easily separating or coming off by being easily forcibly inserted into the hooks by the guidance of the ribs while an area where the ribs are in contact with the wiring is minimized.

(5) In addition, since a pair of hooks are configured so that a gap between the hooks becomes narrower as the hooks go from the inside toward the outside, as the wiring is pressed against the hooks, the gap between the hooks can spread and return to their original state, thereby more firmly supporting and fixing the wiring.

(6) Further, since a press-fit groove is formed to position a branch portion of the wiring that branches out of the headliner in an outer portion of the hook, the wiring can be firmly fixed in a designated position, and the quality also can be improved by preventing the headliner from lifting off a roof panel.

What is claimed is:

1. An overhead console (OHC) mounting bracket for vehicles, comprising a bracket body (100) installed on an edge of a mounting hole (11) formed to pass through a headliner (10) to mount an OHC, wherein one or more support members for fixing and supporting wiring (W) are formed integrally with the bracket body (100) at a front and both sides based on a traveling direction of a vehicle, and the support member includes:

a pair of hooks (110' and 110") that have ribs (111) formed to integrally protrude on surfaces thereof facing each other and are formed so that the wiring W is forcibly inserted between the surfaces by placing the wiring W between the surfaces and pressing the wiring toward a surface of the headliner (10);

a plurality of reinforcing protrusions (120) formed at predetermined intervals on an outer surface of the hook (110') formed toward an outer edge of the bracket body (100); and a plurality of connecting members (130) formed at predetermined intervals between an outer surface of the hook (110") formed on an inner edge of the bracket body (100) and a bent and protruding portion on the inner edge of the bracket body (100).

2. The OHC mounting bracket of claim 1, wherein a gap between the hooks (110' and 110") becomes narrower as the hooks (110' and 110") protrude further outward from a surface of the bracket body (100).

3. The OHC mounting bracket of claim 1, wherein the ribs (111) are formed at predetermined intervals along a direction in which the wiring (W) is inserted between the hooks (110' and 110") and have entrances formed to protrude to face each other.

4. The OHC mounting bracket of claim 3, wherein in the hook (110') forming an outer side of a support member installed in the front based on the traveling direction of the vehicle among the support members, a press-fit groove (112) is formed by being cut to forcibly insert the wiring (W).

5. The OHC mounting bracket of claim 2, wherein in the hook (110') forming an outer side of a support member installed in the front based on the traveling direction of the vehicle among the support members, a press-fit groove (112) is formed by being cut to forcibly insert the wiring (W).

6. The OHC mounting bracket of claim 1, wherein in the hook (110') forming an outer side of a support member installed in the front based on the traveling direction of the vehicle among the support members, a press-fit groove (112) is formed by being cut to forcibly insert the wiring (W).

* * * * *